US009537932B2

United States Patent
Bansal et al.

(10) Patent No.: US 9,537,932 B2
(45) Date of Patent: Jan. 3, 2017

(54) EMULATING TEST DISTRIBUTED APPLICATION ON SERVER

(71) Applicant: Microsoft Technology Licensing, LLC, Redmond, WA (US)

(72) Inventors: Munish Bansal, Yakima, WA (US); Maneesh Sah, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 14/061,556

(22) Filed: Oct. 23, 2013

(65) Prior Publication Data
US 2015/0113033 A1    Apr. 23, 2015

(51) Int. Cl.
H04L 29/08    (2006.01)
G06F 9/455    (2006.01)

(52) U.S. Cl.
CPC .......... *H04L 67/10* (2013.01); *G06F 9/45558* (2013.01); *G06F 2009/45562* (2013.01); *G06F 2009/45591* (2013.01); *G06F 2009/45595* (2013.01)

(58) Field of Classification Search
CPC ............... H04L 29/08072; H04L 29/06; H04L 29/08135
USPC ........................................................ 709/201
See application file for complete search history.

(56) References Cited

U.S. PATENT DOCUMENTS

| 7,653,689 | B1 | 1/2010 | Champagne et al. | |
| 7,802,000 | B1* | 9/2010 | Huang .................. | G06F 9/5077 455/404.2 |
| 2007/0168970 | A1* | 7/2007 | Li et al. .................. | 717/124 |
| 2010/0313185 | A1* | 12/2010 | Gupta et al. ................ | 717/124 |
| 2011/0023031 | A1* | 1/2011 | Bonola et al. ............... | 718/1 |
| 2012/0311569 | A1* | 12/2012 | Shah ......................... | 718/1 |

OTHER PUBLICATIONS

Jeremy Richardson, "Creating a Domain Network in a test environment using VirtualBox", a blog article retrieved from http://community.spiceworks.com/how_to/6821-creating-a-domain-network-in-a-test-environment-using-virtualbox, Jul. 2012.*
Lowe, SolutionBase: Create an entire test lab on one system using Virtual PC, retrieved from a web blog, Apr. 26, 2004.*

(Continued)

*Primary Examiner* — Nicholas Taylor
*Assistant Examiner* — Chong G Kim
(74) *Attorney, Agent, or Firm* — Ben Tabor; Kate Drakos; Micky Minhas (57) ABSTRACT

The use of a single physical server in which there are multiple virtual nodes operating different components of a distributed application under test. Each virtual node emulates an actual physical node in a prospective distributed environment. The virtual nodes might be, for example, virtual machines or emulated services, and may operate their own operating system within the context of the virtual node. The distributed environment is emulated on the physical server by having the virtual nodes communicate with each other using the protocols that they would normally use in a deployed distributed environment. A configuration data source may be used to setup and perhaps upgrade the virtual nodes so as to emulate the distributed environment. Accordingly, the distributed application may be tested without actually setting up a distributed environment.

21 Claims, 3 Drawing Sheets

(56) References Cited

OTHER PUBLICATIONS

Duffy, VMware Lab setup—A virtualized lab for testing HA and DRS, retrieved from a web blog, Apr. 12, 201.*
Virtual Laboratory ("Virtual Laboratory", a technical paper retrieved from a website http://computerscience.unicam.it/marcantoni/tesi/Virtuarl%20Laboratory%20-%20Quagga.pdf, Jan. 2011).*
"International Search Report and Written Opinion Issued in PCT Application No. PCT/US2014/061441", Mailed Date: Jan. 7, 2015, 7 Pages.
Richardson, Jeremy, "Creating a Domain Network in a Test Environment Using Virtual Box—Spiceworks", Published on: Apr. 3, 2013. Available at <<https://web.archive.org/web/20130403033649/http://community.spiceworks.com/how_to/show/6821-creating-a-domain-network-in-a-test-environment-using-virtualbox>>.
"CDN in a Box", Published on: Oct. 21, 2011, Available at: https://www.streamzillacdn.com/cdn-in-a-box/.
Moreira, et al., "A Case for Virtualization of Content Delivery Networks", In Proceedings of the Winter Simulation Conference, Dec. 11, 2011, 12 pages.
"Interoperability", Published on: Oct. 19, 2012, Available at: http://www.velocix.com/vx-portfolio/functions/interoperability.
Awadallah, et al., "The vMatrix: A Network of Virtual Machine Monitors for Dynamic Content Distribution", In Proceedings of the 7th International Workshop on Web Content Caching and Distribution, Aug. 2002, 12 pages.
Chellouche, et al., "Home-Box-Assisted Content Delivery Network for Internet Video-on-Demand Services", In IEEE Symposium on Computers and Communications, Jul. 1, 2012, 7 pages.
"StrikeTracker® Console", Published on: Nov. 7, 2011, Available at: http://www.highwinds.com/cdn/striketracker2.php.
"Wholesale Content Delivery Networks: Unlocking New Revenue Streams and Content Relationships", Published on: Jun. 5, 2013, Available at: http://www.cisco.com/en/US/prod/collateral/video/ps7191/ps7127/white_paper_c11-710667.html.
"International Preliminary Report on Patentability Issued in PCT Application No. PCT/US2014/061441", Mailed Date: Jan. 5, 2016, 6 Pages.
"Second Written Opinion Issued in PCT Application No. PCT/US2014/061441", Mailed Date: Oct. 1, 2015, 5 Pages.

* cited by examiner

EMULATING TEST DISTRIBUTED APPLICATION ON SERVER

BACKGROUND

Computers and computing systems have affected nearly every aspect of modern living. Computing systems are providing ever more complex and sophisticated functionality. Such functionality is often primarily driven by underlying software, which itself is becoming ever more complex. Some of the more sophisticated functionality involves computing systems communicating one with another using a network. For instance, the Internet is a world-wide consortium of constituent computing networks that allow computing systems to complete a communication world-wide.

Such improved capability in communication has allowed applications to be widely distributed across multiple computing systems, each computing system playing a certain role in the overall accomplishment of the application functionality. The various computing systems may have different operating systems, and collaborate via network communications in accordance with established communication protocols.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein refer to operations in a single physical server in which there are multiple virtual nodes operating different components of a distributed application under test. Each virtual node emulates an actual physical node in a prospective distributed environment. The virtual nodes might be, for example, virtual machines or emulated services, and may operate their own operating system within the context of the virtual node. The distributed environment is emulated on the physical server by having the virtual nodes communicate with each other using the protocols that they would normally use in a deployed distributed environment. A configuration data source may be used to setup and perhaps upgrade the virtual nodes so as to emulate the distributed environment. Accordingly, the distributed application may be tested without actually setting up a distributed environment.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein refer to operations in a single physical server in which there are multiple virtual nodes operating different components of a distributed application under test. Each virtual node emulates an actual physical node in a prospective distributed environment. The virtual nodes might be, for example, virtual machines or emulated services, and may operate their own operating system within the context of the virtual node. The distributed environment is emulated on the physical server by having the virtual nodes communicate with each other using the protocols that they would normally use in a deployed distributed environment. A configuration data source may be used to setup and perhaps upgrade the virtual nodes so as to emulate the distributed environment. Accordingly, the distributed application may be tested without actually setting up a distributed environment.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
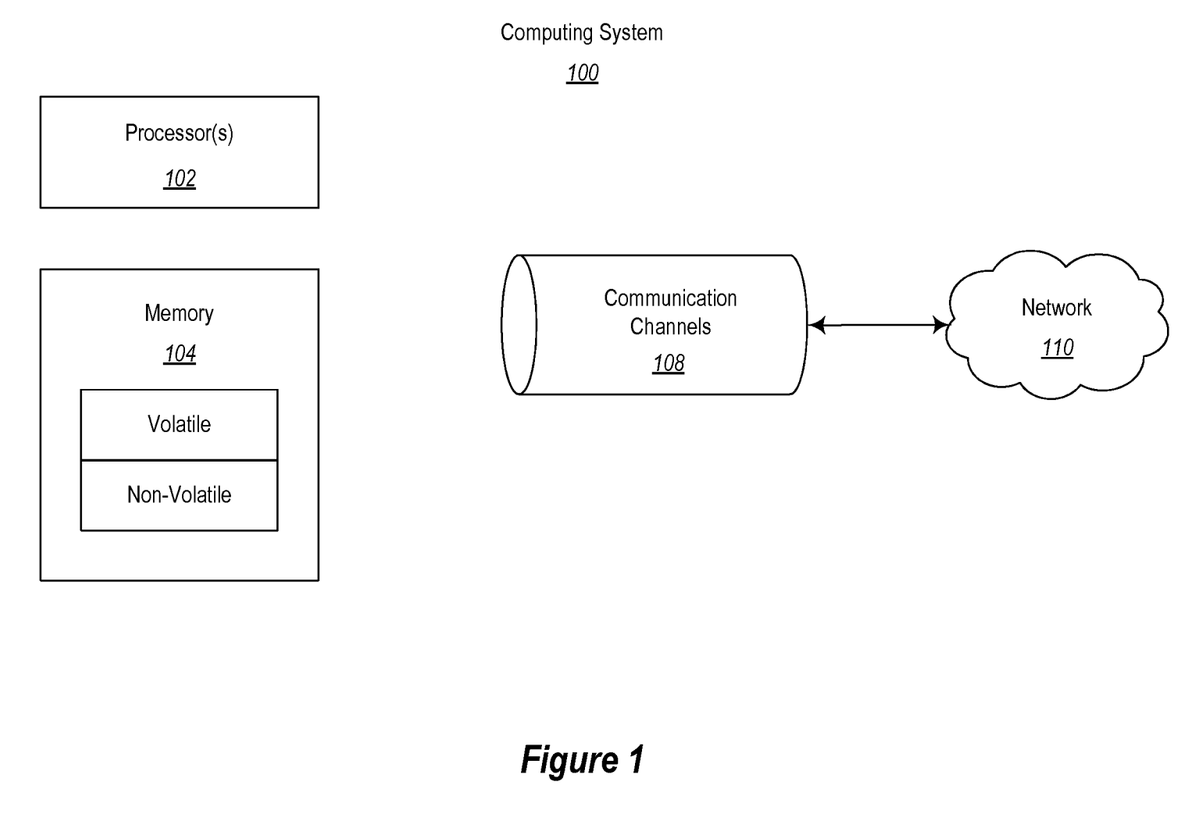
FIG. 1 illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special-purpose or general-purpose computer system that includes computer hardware, such as, for example, one or more processors and system memory, as discussed in greater detail below. The system memory may be included within the overall memory 104. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
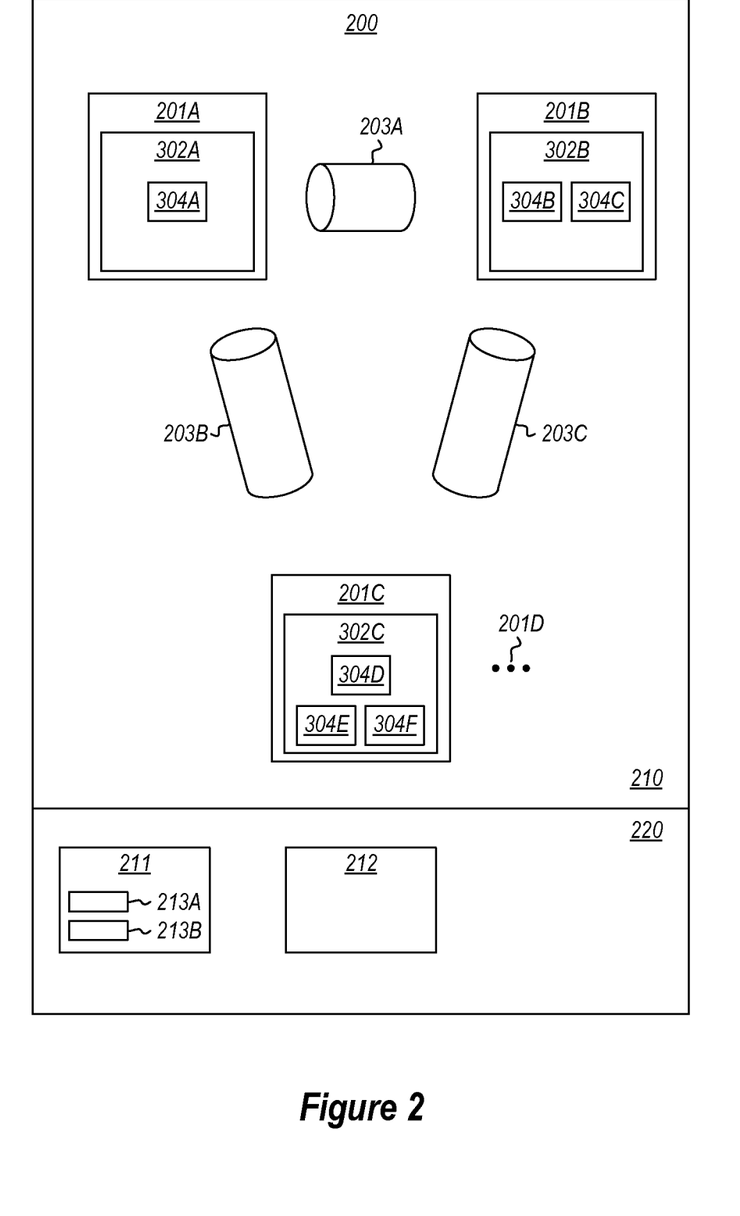
FIG. 2 abstractly illustrates a physical server machine on which there is a support environment that supports an emulation environment in which a distributed application may be tested.

FIG. 2 abstractly illustrates a physical server machine 200. The physical server machine 200 has an emulation environment 210 in which operation of a distributed application under test may be operated in a non-distributed environment. The physical server machine 200 also includes a support environment 220 that provides the emulation environment 210.

Three virtual nodes 201A, 201B and 201C are illustrated as being included within the emulation environment 210 of the physical server machine 200. In this description and in the claims a "virtual node" is a component or collection of components within a physical computing system that allow for the emulation of a machine operating an operating system. Thus, if multiple virtual nodes are operating in a single physical machine, those multiple virtual nodes may operate the same or different operating systems as compared to each other, and the same or a different operating system than the single physical server machine 200 that is running the virtual nodes. Examples of a virtual node include a virtual machine or an emulator. For instance, the emulator might be a service emulator, capable of emulating responses that a distributed service might normally provide in response to client requests.

Figure 3:
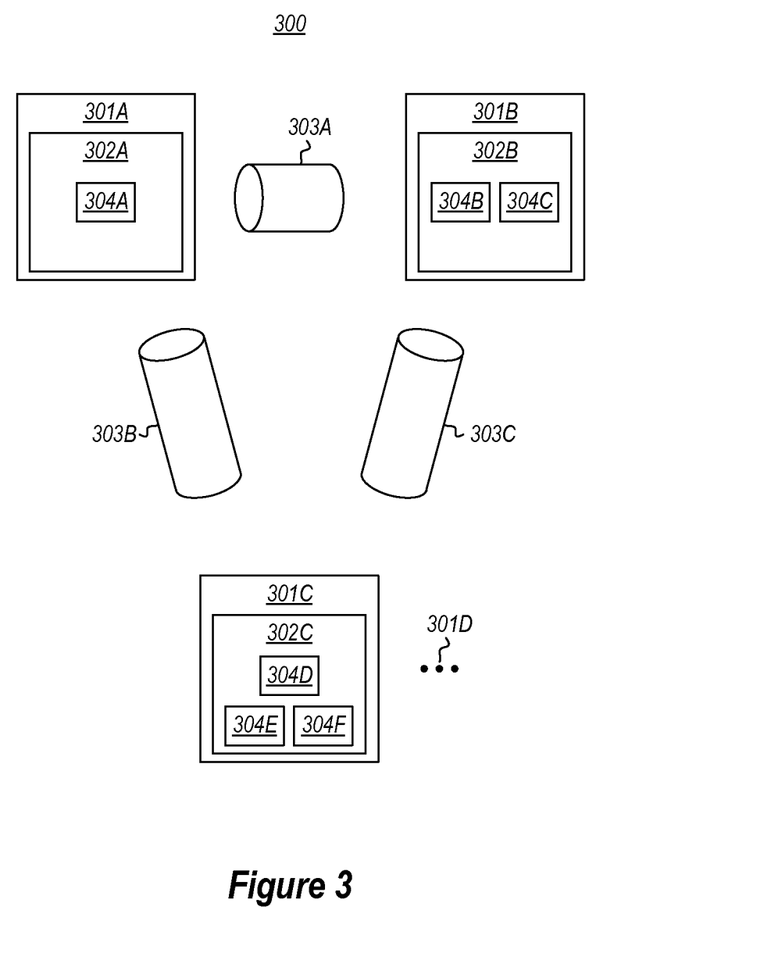
FIG. 3 abstractly illustrates the distributed environment in which the distributed application is designed to operate after deployment.

Each virtual node operates with the same functionality as a corresponding node of a distributed application under test. For instance, FIG. 3 illustrates a distributed environment 300 that is a prospective environment in which the distributed application is to operate. The distributed environment 300 need not actually be set up in order to test the operation of the distributed environment. Instead, the distributed environment 300 is emulated within the physical server machine. Thus, testing of a distributed application may be performed without building an expensive distributed network and/or deploying the distributed application to be tested in that actual distributed environment.

The distributed application includes physical nodes 301A, 301B and 301C. Depending on the function to be accomplished by the overall distributed application, each of the physical nodes 301A through 301C would have their own role. As an example, the distributed application might be a content delivery network in which media and non-media content is delivered from an ultimate source, via a caching infrastructure, to various destinations upon request. In that case, a role might be to originate content, another might be to provide a cached source for media content, another might be to provide a cached source for non-media content, another might be to keep statistics that may be used to intelligently cache, and so forth.

The virtual node 201A on the physical server machine 200 functions and has the same role in the distributed application as would the physical node 301A within the distributed environment 300. The virtual node 201B on the physical server machine 200 functions and has the same role in the distributed application as would the physical node 301B within the distributed environment 300. The virtual node 201C on the physical server machine 200 functions and has the same role in the distributed application as would the physical node 301C within the distributed environment 300. Of course there is no limit to the number of nodes that may operate within a distributed environment. Accordingly, the ellipses 201D and 301D abstractly represent that the principles described herein are not limited of the number of nodes with the distributed application under test.

The virtual nodes operate whatever operating system they might operate within the distributed environment 300 if the distributed application were actually deployed. Furthermore, the operating systems of those virtual nodes operating whichever components might operate within the operating systems of the distributed environment 300 if the distributed application were actually deployed.

For instance, suppose in the distributed application under test, that the physical node 301A is to operate the operating system 302A (that operates component 304A), the physical node 301B is to operate the operating system 302B (that operates components 304B and 304C), and the physical node 301C is to operate the operating system 302C (that operates components 304D, 304E and 304F). In order to properly test such a distributed application within the confines of a single physical server 200, the virtual node 201A likewise operates operating system 302A (that operates component 304A), the virtual node 201B likewise operates operating system 302B (that operates component 304B and 304C), and the virtual node 201C likewise operates operating system 302C (that operates components 304D, 304E and 304F). The operating systems 302A, 302B, 302C may be the same as each other or different than each other.

Referring to FIG. 3, suppose that in order for the distributed application to work, the various physical nodes 301A, 301B, and 301C were to communicate using specific communication channels. For instance, perhaps the physical node 301A is to communicate with the physical node 301B via a communication channel 303A, the physical node 301A is to communicate with the physical node 301C via the communication channel 303B, and the physical node 301B is to communicate with the physical node 301C via the communication channel 303C.

The communication channels 303A through 303C each include a physical medium, which conveys actual bits being transmitted. However, the communication channel also includes a software aspect. For instance, a particular stack of protocols may be used to communicate the bits over the medium so that the transmitter and receiver can coordinate the proper transfer of the data to be transmitted.

Although the exact physical medium is not emulated within the physical server machine 200, every other software levels of the communication channel can be emulated. This is fine because distributed software applications are, in fact, software, and do not include the physical media used to communicate. Accordingly, the communication channel 303A of the distributed application under test is emulated with the virtual communication channel 203A in the physical server machine 200. Likewise, the communication channels 303B and 303C of the distributed application under test are each emulated with the corresponding virtual communication channels 203C and 203C in the physical server machine 200. The virtual communication channels 203A, 203B, and 203C may be operated by, for instance, a virtual network, or perhaps a hypervisor with a properly configured virtual switch.

Thus, there can be as many virtual nodes operating within the single server machine 200 as there are physical nodes designed for the distributed environment 300, with the virtual nodes performing the same role and operating the same operating system as designed for the corresponding physical node. Also, there can be as many virtual communication channels within the signal server machine 200 as there are communication channels designed for the distributed environment 300, with each virtual communication channel emulating the software portions of the corresponding communication channel.

The support environment 200 of the physical server machine 200 includes configuration data source 211 and configuration interpretation module 212. The configuration data source 211 may, but need not be, a configuration file. For instance, the configuration data may include setup information 213A, instructing the configuration interpretation module 212 on how to setup the various virtual nodes and channels within the emulation environment 210. The configuration data might also include upgrade information 213B instructing the configuration interpretation module 212 on how to upgrade the various virtual nodes and channels within the emulation environment 210.

The following represents an example of the setup information expressed in eXtensible Markup Language (XML) with line numbering added for subsequent reference:

```
1.   Role type="unix" vmname="vcdn-cds101.iad9-bsd72"
            defaultIP="192.168.0.21" defaultUser="root"
            defaultPass="pass@word1">
2.      <instancecount>3</instancecount>
3.      <hostnameprefix>cdsserver</hostnameprefix>
4.      <ipstart>90</ipstart>
5.      <ipprefix>192.168.0</ipprefix>
6.      <verificationcommand>
7.          <command>ifconfig</command>
8.          <statuscode>0</statuscode>
9.          <successmsg>"success"</successmsg>
10.         <failuremsg>"failed"</failuremsg>
11.     </verificationcommand>
12.     <cpu />
13.     <memory />
14.     <instanceConfig id="">
15.         <hostName />
16.         <ip />
17.         <verificationcommand>
18.             <command>ifconfig</command>
19.             <statuscode>0</statuscode>
20.             <successmsg>"success"</successmsg>
21.             <failuremsg>"failed"</failuremsg>
22.         </verificationcommand>
23.         <cpu />
24.         <memory />
25.     </instanceConfig>
26. </Role>
```

Internet Protocol (IP) addresses that are to be assigned to the instances of the virtual machine. Lines 6 through 11 specify verification command parameters for letting the setup process know if setup has been completed properly. Line 12 is a place marker element where information regarding the emulated Central Processing Unit (CPU) may be placed. Line 13 is a place marker element where information may be placed regarding the emulated memory of the virtual machine.

Lines 14 through 25 define further configuration information for each instance. A separate instanceConfig element may be provided for each virtual machine instance of this role to be configured, but one is used here. With the id attribute being blank, this is interpreted by the configuration interpretation component 212 as requiring the same configuration to be applied to all instances. Line 15 includes a place marker element for where information may be placed regarding the host name. Line 16 includes a place marker element for where information regarding the Internet Protocol (IP) addresses for the instance may be placed. Lines 18 through 22 include verification command information. Line 23 is a place marker element for where information may be placed regarding the CPU of the instance. Line 24 is a place marker element for where information may be placed regarding the memory of the instance.

The following represents an example of the upgrade information expressed in eXtensible Markup Language (XML) with line numbering added for subsequent reference:

```
1.   <ActionGroup type="execute" name="LegacyProvisionService">
2.      <verificationcommand hostname="vcdn-prov1" instanceid="each">
3.          <command>net stop "Edge Computing CDN Provisioning
                Service"</command>
4.          <statuscode>0</statuscode>
5.          <successmsg>"success"</successmsg>
6.          <failuremsg>"failed"</failuremsg>
7.      </verificationcommand>
8.      <copyDirectoryTo
            srcpath="\\reddog\builds\branches\rd__aecdn__n__dev1__latest__am
            d64fre\bin\Legacy\Provisioning\winsvc
            "
            destpath="\\%hostname%\c$\users\administrator\provisionseriv
            ce" hostname="vcdn-prov1" />
9.      <verificationcommand hostname="vcdn-prov1" instanceid="each">
10.         <command>net start "Edge Computing CDN Provisioning
                Service"</command>
11.         <statuscode>0</statuscode>
12.         <successmsg>"success"</successmsg>
13.         <failuremsg>"failed"</failuremsg>
14.     </verificationcommand>
15.     <copyFileFrom srcpath="\\% hostname%\c$\
            fictionalsourcepath\ProvisionServiceUpdate.log"
            destpath="g:\vCDN\Logs\% hostname
            %\ProvisionServiceUpdate.log" hostname="vcdn-prov1"
            instanceid="each" />
16. </ActionGroup>
```

The entire role is defined from lines 1 through 26 in this example. Other XML may be used to set up other roles. For instance, referring to FIGS. 2 and 3, a role might be any of the virtual nodes 202A through 202C. Line 1 includes attributes that specify the name of the virtual machine, and the type of operating system to be run by the virtual machine. Further default configuration information for the virtual machine is also specified in line 1 such as a default IP address, default user, and default credentials.

Line 2 instructs that three instances of the virtual machine are to be set up. Line 3 specifies the prefix of the host name. Lines 4 and 5 collectively define the beginning range of In this case, the upgrade operation is expressed in terms of an ActionGroup element that extends from lines 1 through 16. Here, there are two commands, each involving copying files from a source location to a destination location.

Accordingly, an effective and convenient mechanism for setting up and testing a distributed application on a single server machine have been described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A physical server machine for emulating a distributed application in which different components of the distributed application are deployed on different machines in a distributed network environment and wherein the physical server machine emulates all of the different machines on which the distributed application is deployed within the physical server machine, the physical server machine comprising:
   a first instance of a first virtual node operating thereon a first operating system, the first operating system corresponding to a first operating system of a first physical machine in a distributed network environment, the first instance of the first virtual node operating a first component of the distributed application, the first component having a first role that corresponds to a same first component being deployed on the first physical machine, the first instance of the first virtual node functioning and having a same first role in the distributed application as it would have in the first physical machine within the distributed network environment, wherein the first role of the first component is defined by a configuration file that is applied to other instances of the first virtual node, and such that the first role is shared by all of a plurality of instances that are created of the first virtual node;
   a first instance of a second virtual node operating thereon a second operating system that is different than the first operating system, the second operating system corresponding to a second operating system of a second physical machine in the distributed network environment, the first instance of the second virtual node operating a second component of the distributed application, the second component having a second role that corresponds to a same second component being deployed on the second physical machine, the first instance of the second virtual node functioning and having a same second role in the distributed application as it would have in the second physical machine within the distributed network environment, the second role being different than the first role and the second component being different than the first component of the distributed application, wherein the second role of the second component is defined by a different configuration file that is applied to other instances of the second virtual node, and such that the second role is shared by all of a plurality of instances that are created of the second virtual node; and
   a communication channel between the first and second virtual nodes, the communication channel comprising a hypervisor and a virtual switch, the communication channel using a same communication protocol that the first component and the second component are configured to utilize in a distributed environment for communicating between the first and second physical machines.

2. The physical server machine in accordance with claim 1, the first virtual node being a virtual machine.

3. The physical server machine in accordance with claim 1, the first virtual node being a first virtual machine, and the second virtual node being a second virtual machine.

4. The physical server machine in accordance with claim 1, the second virtual node being a service emulator.

5. The physical server machine in accordance with claim 1, wherein the application is a content delivery network service.

6. The physical server machine in accordance with claim 1, the communication channel being a virtual network.

7. The physical server machine in accordance with claim 1, further comprising:
   a configuration data source that contains computer-executable instructions for setting up the first virtual node, and the second virtual node.

8. The physical server machine in accordance with claim 1, further comprising:
   a configuration data source that contains computer-executable instructions for upgrading the first virtual node.

9. A computer program product comprising one or more computer-readable hardware storage media having thereon computer-executable instructions that are executable by one or more processors of a physical server which cause the physical server to instantiate and/or operate the following on the physical server:
   a first instance of a first virtual node operating thereon a first operating system, the first operating system corresponding to a first operating system of a first physical machine in a distributed network environment, the first instance of the first virtual node operating a first component of the distributed application, the first component having a first role that corresponds to a same first component being deployed on the first physical machine, the first instance of the first virtual node functioning and having a same first role in the distributed application as it would have in the first physical machine within the distributed network environment, wherein the first role of the first component is defined by a configuration file that is applied to other instances of the first virtual node, and such that the first role is shared by all of a plurality of instances that are created of the first virtual node;
   a first instance of a second virtual node operating thereon a second operating system that is different than the first operating system, the second operating system corresponding to a second operating system of a second physical machine in the distributed network environment, the first instance of the second virtual node operating a second component of the distributed application, the second component having a second role that corresponds to a same second component being deployed on the second physical machine, the first instance of the second virtual node functioning and having a same second role in the distributed application as it would have in the second physical machine within the distributed network environment, the second role being different than the first role and the second component being different than the first component of the distributed application, wherein the second role of the second component is defined by a different configuration file that is applied to other instances of the second virtual node, and such that the second role is shared by all of a plurality of instances that are created of the second virtual node; and
   a communication channel between the first and second virtual nodes, the communication channel comprising a hypervisor and a virtual switch, the communication channel using a same communication protocol that the first component and the second component are configured to utilize in a distributed environment for communicating between the first and second physical machines.

10. The computer program product in accordance with claim 9,
the first virtual node being a virtual machine.

11. The computer program product in accordance with claim 9, the first virtual node being a first virtual machine, and
the second virtual node being a second virtual machine.

12. The computer program product in accordance with claim 9,
the second virtual node being a service emulator.

13. The computer program product in accordance with claim 9, wherein the application is a content delivery network service.

14. The computer program product in accordance with claim 9, the communication channel being a virtual network.

15. The computer program product in accordance with claim 9, wherein the computer-executable instructions comprise:
a configuration data source that contains computer-executable instructions for setting up the first virtual node, and the second virtual node.

16. The computer program product in accordance with claim 9, wherein the computer-executable instructions comprise:
a configuration data source that contains computer-executable instructions for upgrading the first virtual node.

17. The computer program product in accordance with claim 9, wherein the computer-executable instructions comprise:
a configuration data source that contains computer-executable instructions for setting up the communication channel.

18. The physical server machine of claim 1,
wherein the configuration file further defines a first range of communication addresses such that each instance of the first virtual node is assigned a communication address that lies within the first range of communication addresses, and
wherein the different configuration file further defines a second range of communication addresses such that each instance of the second virtual node is assigned a communication address that lies within the second range of communication addresses; and
a configuration data source that contains computer-executable instructions for setting up the first virtual node and the second virtual node.

19. The computer program product of claim 9, wherein the configuration file further includes information indicating how each instance of the first virtual node is to be configured.

20. The computer program product of claim 19, wherein the information included within the configuration file includes an id attribute, and wherein the computer-executable instructions further cause the physical server to:

upon a condition in which the id attribute is blank in the configuration file, apply a same configuration to each instance of the first virtual node.

21. A method for emulating a distributed application in which different components of the distributed application are deployed on different machines in a distributed network environment and wherein the physical server machine emulates all of the different machines on which the distributed application is deployed within the physical server machine, the method comprising:
emulating a first instance of a first virtual node operating thereon a first operating system, the first operating system corresponding to a first operating system of a first physical machine in a distributed network environment, the first instance of the first virtual node operating a first component of the distributed application, the first component having a first role that corresponds to a same first component being deployed on the first physical machine, the first instance of the first virtual node functioning and having a same first role in the distributed application as it would have in the first physical machine within the distributed network environment, wherein the first role of the first component is defined by a configuration file that is applied to other instances of the first virtual node, and such that the first role is shared by all of a plurality of instances that are created of the first virtual node;
emulating a first instance of a second virtual node operating thereon a second operating system that is different than the first operating system, the second operating system corresponding to a second operating system of a second physical machine in the distributed network environment, the first instance of the second virtual node operating a second component of the distributed application, the second component having a second role that corresponds to a same second component being deployed on the second physical machine, the first instance of the second virtual node functioning and having a same second role in the distributed application as it would have in the second physical machine within the distributed network environment, the second role being different than the first role and the second component being different than the first component of the distributed application, wherein the second role of the second component is defined by a different configuration file that is applied to other instances of the second virtual node, and such that the second role is shared by all of a plurality of instances that are created of the second virtual node; and
providing a communication channel between the first and second virtual nodes, the communication channel comprising a hypervisor and a virtual switch, the communication channel using a same communication protocol that the first component and the second component are configured to utilize in a distributed environment for communicating between the first and second physical machines.

* * * * *